(12) United States Patent
Takiguchi et al.

(10) Patent No.: US 6,216,076 B1
(45) Date of Patent: Apr. 10, 2001

(54) SELECT-SHOCK CONTROL SYSTEM OF AUTOMOTIVE AUTOMATIC TRANSMISSION

(75) Inventors: Masahiro Takiguchi; Yoshifumi Fujita, both of Shizuoka (JP)

(73) Assignee: Jatco Corporation, Fuji (JP)

( * ) Notice: Subject to any disclaimer, the term of this patent is extended or adjusted under 35 U.S.C. 154(b) by 0 days.

(21) Appl. No.: 09/072,184

(22) Filed: May 5, 1998

(30) Foreign Application Priority Data

May 14, 1997 (JP) .................................................. 9-124210

(51) Int. Cl.$^7$ .................................................. F16H 61/06
(52) U.S. Cl. .................................. 701/55; 701/51; 477/50
(58) Field of Search .................................. 701/55, 51, 79, 701/87; 477/50, 52

(56) References Cited

U.S. PATENT DOCUMENTS

| | | | |
|---|---|---|---|
| 4,470,117 | * 9/1984 | Miki et al. .............................. | 701/51 |
| 4,977,992 | * 12/1990 | Ohtsuka et al. ....................... | 477/78 |
| 4,987,982 | * 1/1991 | Yamaguchi ........................... | 192/3.57 |
| 5,249,483 | * 10/1993 | Iizuka .................................... | 477/117 |
| 5,272,939 | * 12/1993 | Markyvech et al. ................ | 477/120 |
| 5,323,668 | * 6/1994 | Nakagawa et al. .................. | 477/163 |
| 5,733,220 | 3/1998 | Iizuka ................................... | 477/116 |

FOREIGN PATENT DOCUMENTS

| | | |
|---|---|---|
| 3-28571 | 2/1991 | (JP) . |
| 9-68266 | 3/1997 | (JP) . |

* cited by examiner

Primary Examiner—Michael J. Zanelli
Assistant Examiner—Eric M Gibson
(74) Attorney, Agent, or Firm—Foley & Lardner

(57) ABSTRACT

A select-shock control system of an automotive automatic transmission is shown. The transmission has an engaging element which becomes engaged due to application of hydraulic pressure thereto when it is needed to shift the transmission from a neutral condition to a drive condition. The control system comprises a select determination section which determines whether or not the transmission should be actually shifted from the neutral condition to the drive condition; an accelerator pedal depression sensing section which senses depression of an accelerator pedal; and a control section which, when the accelerator pedal depression sensing section senses the depression of the accelerator pedal just after determination of the drive condition from the neutral condition by the select determination section, raises obliquely the hydraulic pressure from a first lower level which was kept before depression of the accelerator pedal to a second higher level corresponding to the degree by which the accelerator pedal has just been depressed.

6 Claims, 12 Drawing Sheets

|  | REV/C | HIGH/C | 2-4/B | LOW/C | L&R/B | LOW O.W.C |
|---|---|---|---|---|---|---|
| 1st SPEED |  |  |  | ○ | ◌ | ◍ |
| 2nd SPEED |  |  | ○ | ○ |  |  |
| 3rd SPEED |  | ○ |  | ○ |  |  |
| 4th SPEED |  | ○ | ○ |  |  |  |
| Rev. | ○ |  |  |  | ○ |  |

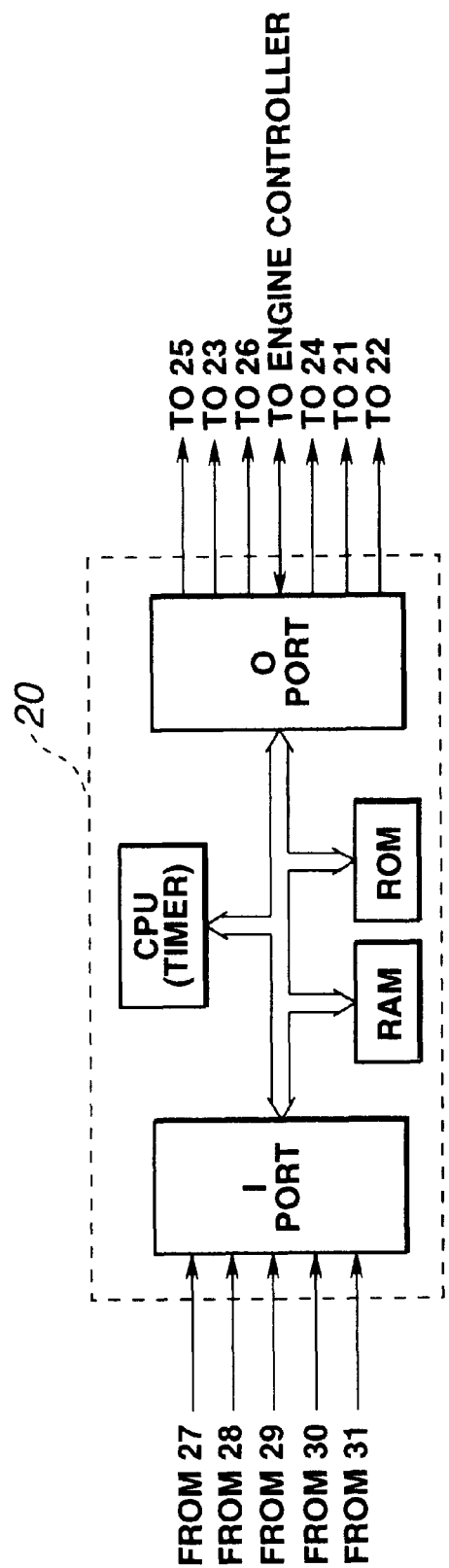

| GEAR POSITION | SOLENOID | 1st SHIFT SOLENOID (21) | 2nd SHIFT SOLENOID (22) |
|---|---|---|---|
| 1st SPEED | | ○ | ○ |
| 2nd SPEED | | × | ○ |
| 3rd SPEED | | × | × |
| 4th SPEED | | ○ | × |

{ ○ ····· ON (DRAIN CIRCUIT CLOSED STATE)
  × ····· OFF (DRAIN CIRCUIT OPEN STATE) }

IDLE SELECTION CONTROL REGION

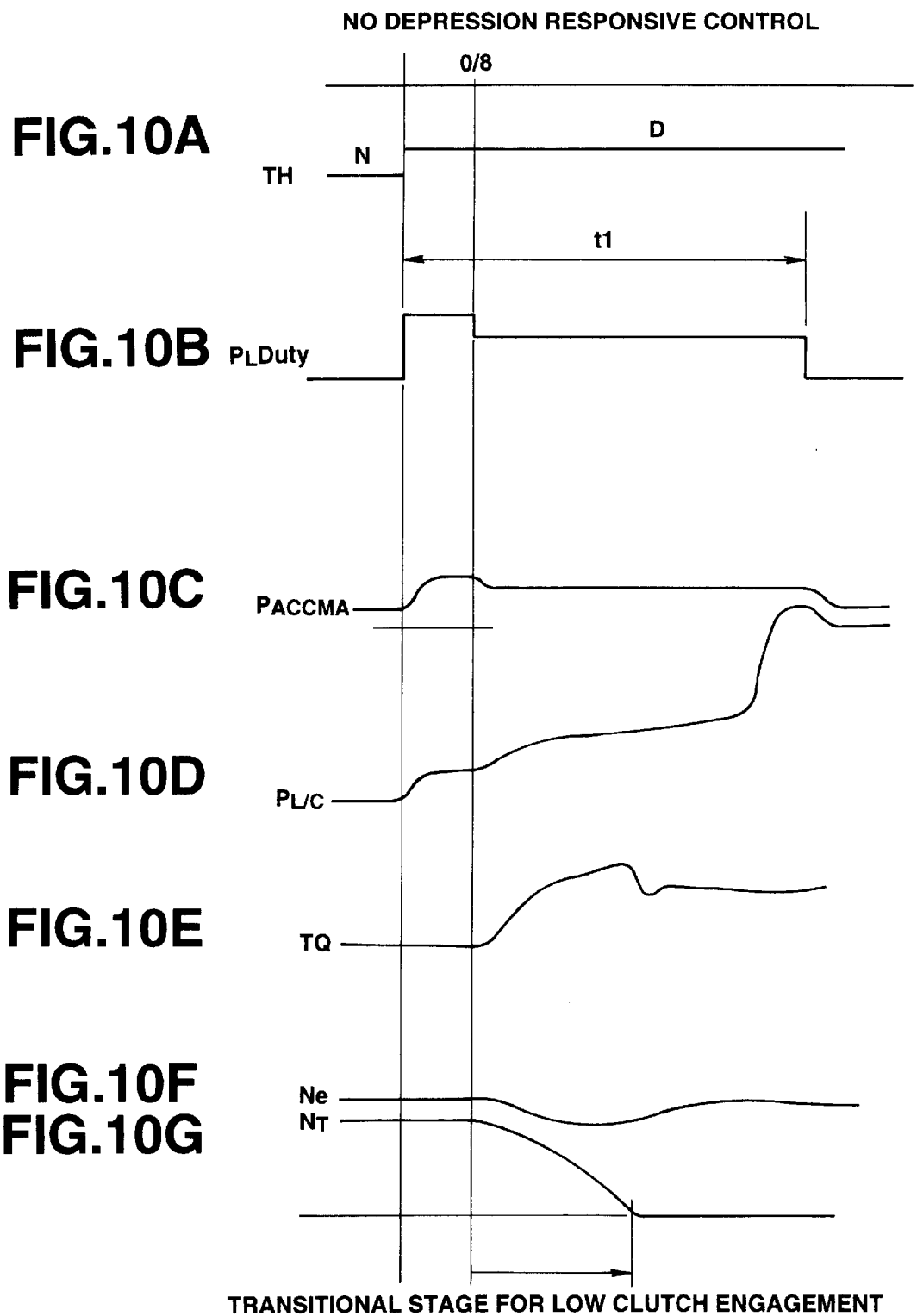

IMMEDIATE DEPRESSION RESPONSIVE CONTROL
FIG.11A T<sub>H</sub>
FIG.11B N
FIG.11C P<sub>L Duty</sub>
FIG.11D P<sub>ACCMA</sub>
FIG.11E P<sub>L/C</sub>
FIG.11F T<sub>Q</sub>
FIG.11G N<sub>e</sub>
FIG.11H N<sub>T</sub>
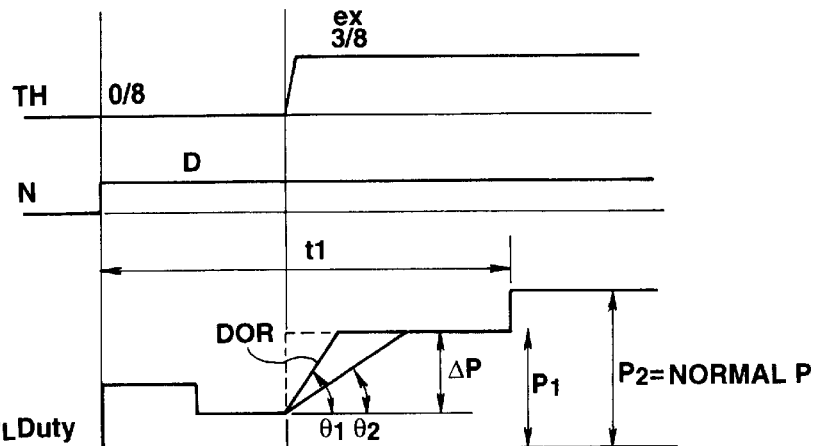
TRANSITIONAL STAGE FOR LOW CLUTCH ENGAGEMENT IMMEDIATE & DEEP DEPRESSION RESPONSIVE CONTROL
FIG.12A  TH 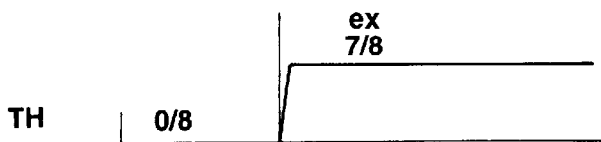

FIG.12C  P_LDuty 
FIG.12D  P_ACCM 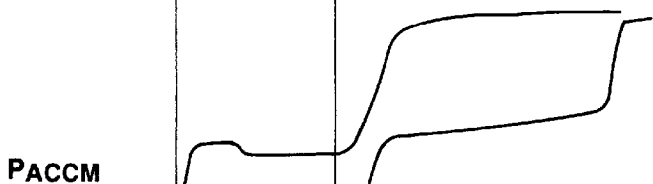
FIG.12E  P_L/C 
FIG.12F  TQ 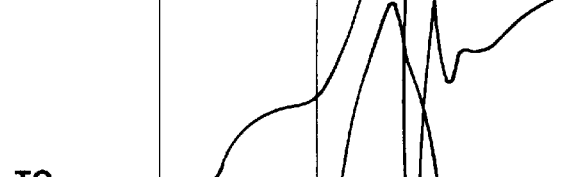
FIG.12G  Ne
FIG.12H  NT 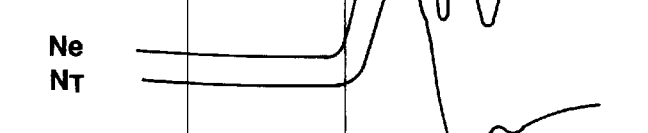
TRANSITIONAL STAGE FOR LOW CLUTCH ENGAGEMENT

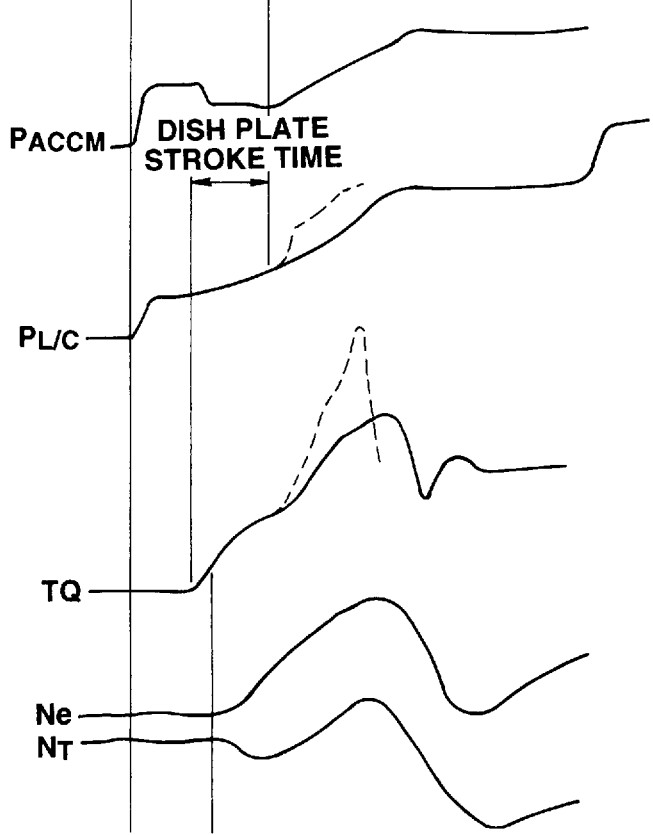
DEPRESSION RESPONSIVE CONTROL UNDER DISH PLATE STROKE

SLOW DEPRESSION RESPONSIVE CONTROL
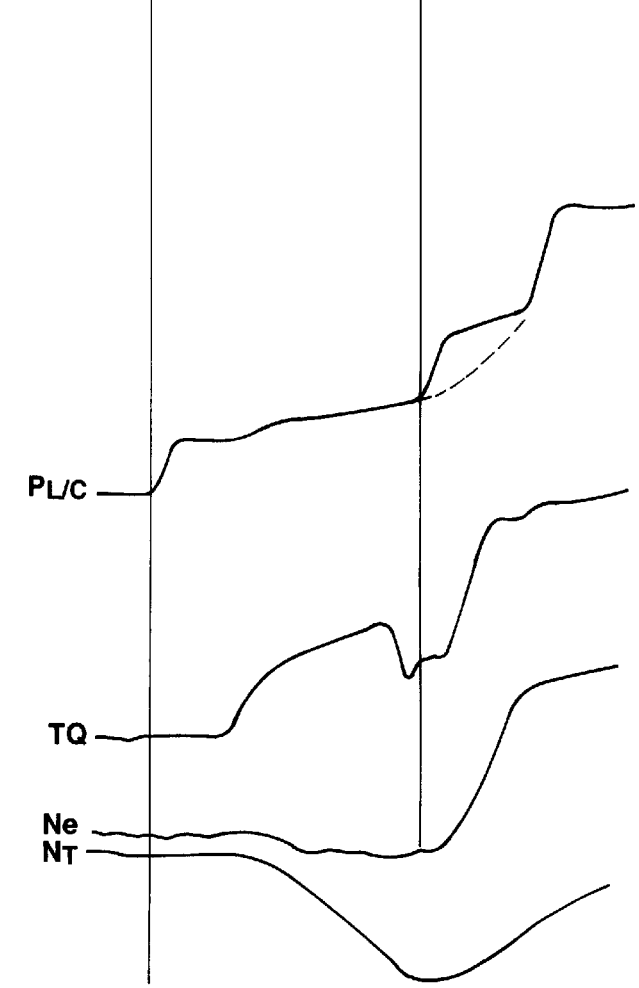

PRIOR ART
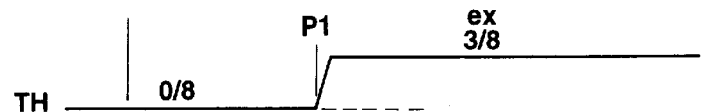
FIG.15A
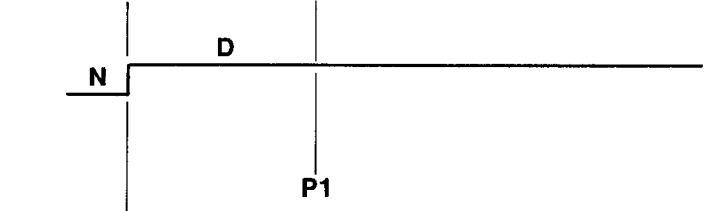
FIG.15B
FIG.15C
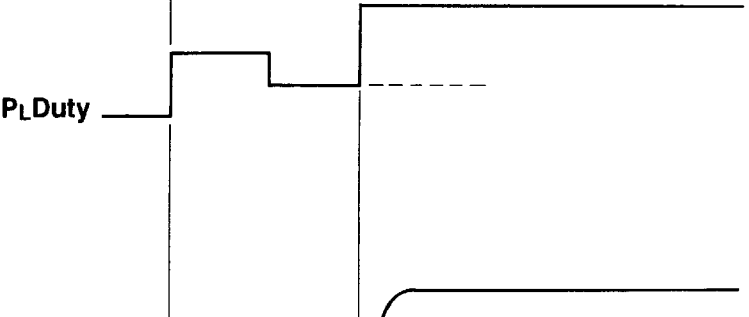
FIG.15D
FIG.15E
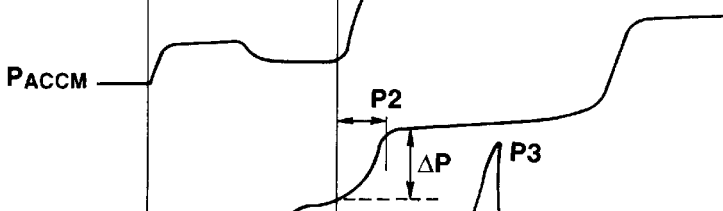
FIG.15F
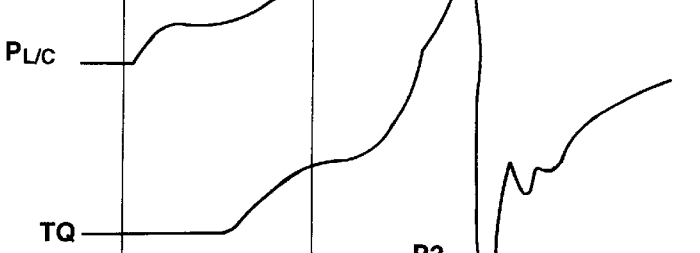
FIG.15G
FIG.15H
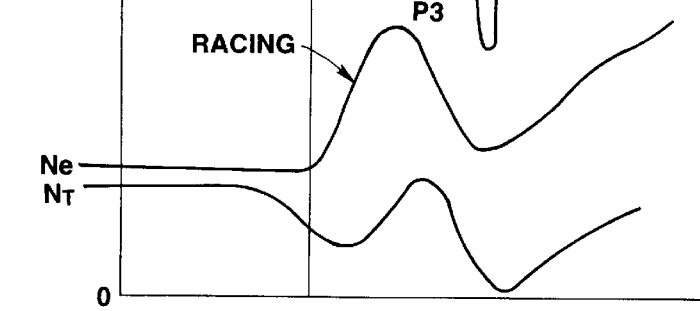

SELECT-SHOCK CONTROL SYSTEM OF AUTOMOTIVE AUTOMATIC TRANSMISSION

BACKGROUND OF THE INVENTION

1. Field of the Invention

The present invention relates in general to control systems of an automotive automatic transmission, and more particularly to the control systems of a select-shock suppression type which suppresses or at least minimizes uncomfortable select-shock which would occur when a shift lever of the transmission is shifted from a neutral (N) position to a driving (D) position. More specifically, the present invention is concerned with the select-shock control systems of a type which, for reducing the select-shock, controls a hydraulic pressure applied to a corresponding engaging element of the transmission upon such N→D shifting.

2. Description of the Prior Art

When, under idling of an engine, an accelerator pedal is depressed just after movement of a shift lever from a neutral (N) position to a drive (D) position, racing of the engine tends to occur because of delayed rising of hydraulic pressure as compared with rising of torque and rotation speed of the engine. That is, in such case, engagement of a corresponding clutch can not keep up with the rising of the engine speed, which tends to induce an uncomfortable select-shock.

The above-mentioned undesired phenomenon will be briefly described with reference to the time charts of FIGS. 15A to 15H of the accompanying drawings. As is understood from the points "P1" of the time charts of FIGS. 15A and 15C (viz., "TH" and "PLDuty"), in the control system of the automatic transmission, a throttle opening degree (viz., depression degree of the accelerator pedal) is monitored, and a line pressure control is so made that the line pressure duty command signal "PLDuty" is instantly shifted to a higher level upon sensing a certain open degree of the throttle valve.

Thus, in the above-mentioned control system, as is understood from the points "P2" of the time chart of FIG. 15E (viz., "PL/C"), after the engine is about to race due to depression of the accelerator pedal, the hydraulic pressure for the low clutch starts to rise and instantly the clutch engaging pressure is raised by "ΔP". This instant rising of the low clutch engaging hydraulic pressure however interrupts the increasing torque and increasing rotation of the engine, which causes a sudden drop of the engine torque and engine speed as is understood from the points "P3" of the time charts of FIGS. 15F and 15G (viz., "TQ" and "Ne"). As is known, such sudden drop causes the uncomfortable select-shock.

SUMMARY OF THE INVENTION

It is therefore an object of the present invention to provide a select-shock control system of an automotive automatic transmission, which is free of the above-mentioned drawback.

According to the present invention, there is provided a select-shock control system of an automatic transmission, which can suppress or at least minimize undesired select-shock which would occur when, under idling of an engine, an acceleration pedal is depressed just after movement of a shift lever from a neutral (N) position to a drive (D) position.

According to the present invention, there is provided a select-shock control system of an automotive automatic transmission in which an engaging element becomes engaged due to application of hydraulic pressure thereto when it is needed to shift the transmission from a neutral condition to a drive condition. The control system comprises a select determination section which determines whether or not the transmission has just been shifted from the neutral condition to the drive condition; an accelerator pedal depression sensing section which senses depression of an accelerator pedal; and a control section which, when the accelerator pedal depression sensing section senses the depression of the accelerator pedal just after determination of the drive condition from the neutral condition by the select determination section, positively induces an oblique rise of the hydraulic pressure from a first lower level which has been kept before depression of the accelerator pedal to a second higher level corresponding to the degree by which the accelerator pedal is depressed.

BRIEF DESCRIPTION OF THE DRAWINGS

Other objects and advantages of the present invention will become apparent from the following description when taken in conjunction with the accompanying drawings, in which:

FIG. 3B is a schematic view of a control unit employed in the select-shock control system of the invention;

FIGS. 10A to 10G are graphs showing time charts of various characteristics which are exhibited when, under idling of an engine, no depression of an acceleration pedal is made just after movement of a shift lever from a neutral (N) position to a drive (D) position;

FIGS. 11A to 11H are graphs showing time charts of various characteristics which are exhibited when, under idling of the engine, the acceleration pedal is depressed just after movement of the shift lever from the neutral (N) position to the drive (D) position;

FIGS. 12A to 12H are graphs showing time charts of various characteristics which are exhibited when, under idling of the engine, the acceleration pedal is deeply depressed just after movement of the shift lever from the neutral (N) position to the drive (D) position;

FIGS. 13A to 13H are graphs showing time charts of various characteristics which are exhibited when, under idling of the engine, the acceleration pedal is depressed during a dish plate stroking period just after movement of the shift lever from the neutral (N) position to the drive (D) position;

FIGS. 14A to 14G are graphs showing time charts of various characteristics which are exhibited when, under idling of the engine, the acceleration pedal is depressed after completion of engagement of the clutch due to N→D movement of the shift lever; and FIGS. 15A to 15H are graphs, obtained by a conventional select-shock control system, showing time charts of various characteristics which are exhibited when, under idling of an engine, an acceleration pedal is depressed just after movement of a shift lever from a neutral (N) position to a drive (D) position.

DETAILED DESCRIPTION OF THE INVENTION

Figures 1, 2:
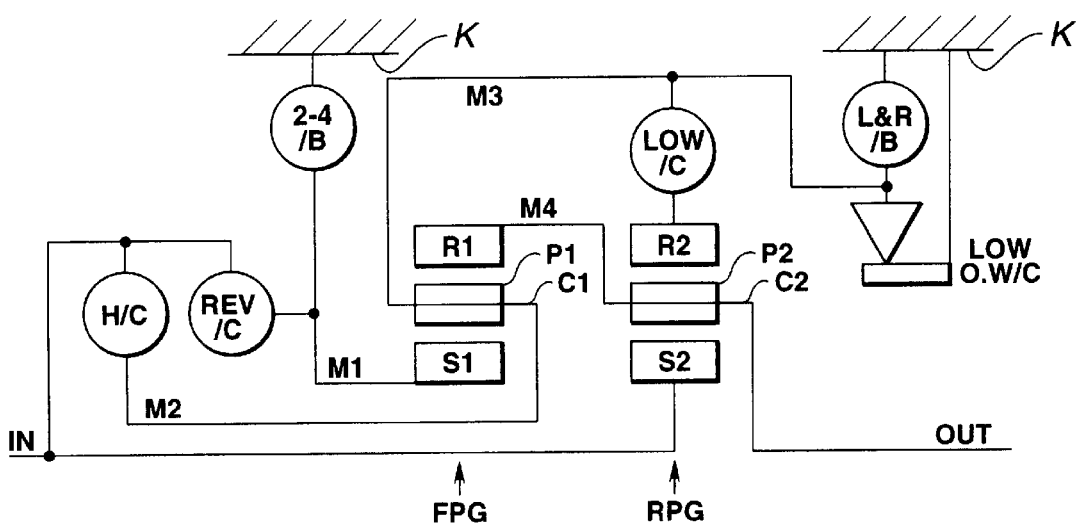
FIG. 1 is a schematic view of an automatic transmission to which a select-shock control system of the present invention is practically applied.
FIG. 2 is a table showing ON/OFF condition of engaging elements of the transmission with respect to various operative conditions of the transmission.

Referring to FIG. 1 of the drawings, there is shown but schematically an automotive automatic transmission to which a select-shock control system of the invention is practically applied.

In FIG. 1, denoted by reference "IN" is an input shaft, "OUT" is an output shaft, "FPG" is a front planetary gear unit, and "RPG" is a rear planetary gear unit. The front planetary gear unit "FPG" comprises a first sun gear "S1", a first ring gear "R1", first pinions "P1" and a first pinion carrier "C1". The rear planetary gear unit "RPG" comprises a second sun gear "S2", a second ring gear "R2", second pinions "P2" and a second pinion carrier "C2".

To provide the transmission with four speed forward drive and one reverse conditions, a reverse clutch "REV/C", a high clutch "HIGH/C", a 2–4 brake "2–4/B", a low clutch "LOW/C", a low and reverse brake "L&R/B" and a low one-way clutch "LOW O.W/C" are arranged in the illustrated manner.

The first sun gear "S1" is connected to the input shaft "IN" through a first rotation member "M1" and the reverse clutch "REV/C", and is connected to a case "K" of the transmission through the first rotation member "M1" and the 2–4 brake "2–4/B".

The first pinion carrier "C1" is connected to the input shaft "IN" through a second rotation member "M2" and the high clutch "HIGH/C", and is connected to the case "K" through a third rotation member "M3" and the low and reverse brake "L&R/B". Furthermore, the first pinion carrier "C1" is connected to the second ring gear "R2" through the third rotation member "M3" and the low clutch "LOW/C". As shown, the low and reverse brake "L&R/B" and the low one-way clutch "LOW O.W/C" are arranged in parallel with each other.

The first ring gear "R1" is connected to the second pinion carrier "C2" through a fourth rotation member "M4" to which the output shaft "OUT" is directly connected.

The second sun gear "S2" is directly connected to the input shaft "IN".

The above-mentioned automatic transmission comprises a reduced numbers of parts for achieving a compact and light weight construction. In fact, this transmission has no part which corresponds to a one-way clutch aimed to smooth the "4–3 down shift change" nor part which corresponds to a hydraulic clutch needed for carrying out engine braking due to employment of the one-way clutch.

FIG. 2 is a table which shows ON/OFF condition of engaging elements of the above-mentioned transmission with respect to the operating conditions (viz., four forward drive and one reverse conditions) of the transmission.

As is seen from this table, the first speed "1st" is achieved by engaging the low clutch "LOW/C" and the low and reverse brake "L&R/B" (under engine braking) or engaging the low clutch "LOW/C" and the low one-way clutch "LOW O.W/C" (under acceleration). That is, under this condition, the engine torque is inputted into the second sun gear "S2", the second ring gear "R2" is fixed and the transmission torque is outputted from the second pinion carrier "C2".

The second speed "2nd" is achieved by engaging the low clutch "LOW/C" and the 2–4 brake "2–4/B". That is, under this condition, the engine torque is inputted into the second sun gear "S2", the first sun gear "S1" is fixed and the transmission torque is outputted from the second pinion carrier "C2".

The third speed "3rd" is achieved by engaging the high clutch "HIGH/C" and the low clutch "LOW/C". That is, under this condition, the engine torque is inputted into both the second ring gear "R2" and the second sun gear "S2", and the torque is outputted from the second pinion carrier "C2". In this condition, the gear ratio is 1 (one).

The fourth speed "4th" is achieved by engaging the high clutch "HIGH/C" and the 2–4 brake "2–4/B". Under this condition, the engine torque is inputted into both the first pinion carrier "C1" and the second sun gear "S2", the first sun gear "S1" is fixed and the transmission torque is outputted from the second pinion carrier "C2". That is, so-called over drive ratio is established in the transmission.

The reverse is achieved by engaging the reverse clutch "REV/C" and the low and reverse brake "L&R/B". That is, under this condition, the engine torque is inputted into both the first and second sun gears "S1" and "S2", the first pinion carrier "C1" is fixed and the transmission torque is outputted from the second pinion carrier "C2".

The 2–4 brake "2–4/B" is of a multi-plate type similar to a multiple disc clutch.

Figure 3A:
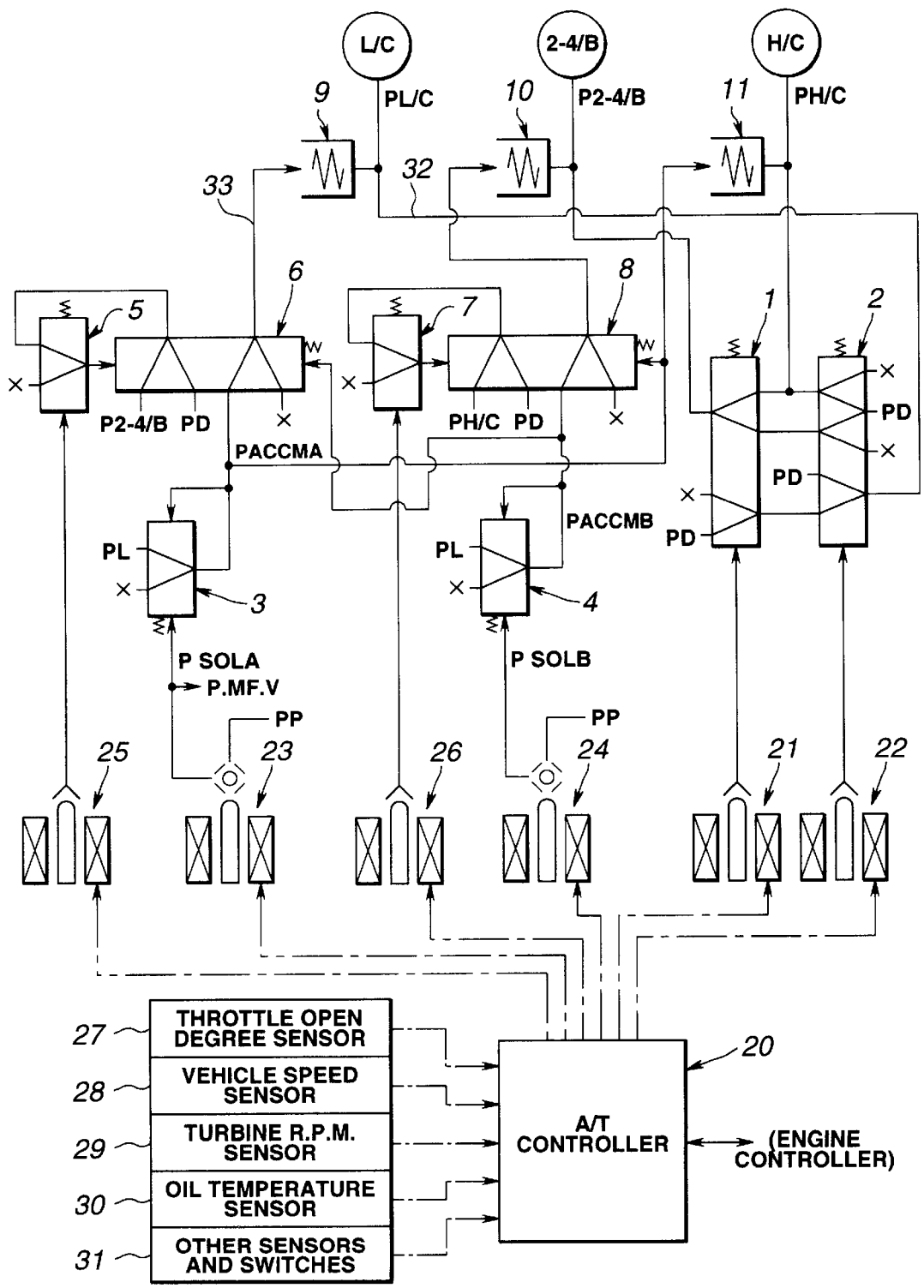
FIG. 3A is a schematic view of the select-shock control system of the present invention.

FIG. 3A is a view showing schematically the select-shock control system of the present invention. That is, shown by this drawing are engaging elements used for achieving an automatic change between the 1st speed and the 4th speed, control valves for hydraulically actuating the engaging elements and an electronic controller for controlling the valves.

As the engaging elements, the low clutch "LOW/C", the 2–4 brake "2–4/B" and the high clutch "HIGH/C" are shown.

As the control valves, a first shift valve 1, a second shift valve 2, a first accumulator control valve 3, a second accumulator control valve 4, a low clutch timing valve 5, a low clutch sequence valve 6, a 2–4 brake timing valve 7 and a 2–4 brake sequence valve 8 are shown. A low clutch accumulator 9, a 2–4 brake accumulator 10 and a high clutch accumulator 11 are incorporated with the valves in the illustrated manner.

In accordance with operation of first and second shift solenoids 21 and 22, the first and second shift valves 1 and 2 switch their fluid passages for achieving the first, second, third or fourth speed.

In accordance with a solenoid pressure "PSOLA" produced by a line pressure duty solenoid 23, the first accumulator control valve 3 reduces a line pressure "PL" thereby to regulate an accumulator control pressure "PACCMA". The solenoid pressure "PSOLA" produced by the line pressure duty solenoid 23 is led to a pressure modifying valve (not shown) which regulates a modifying pressure which acts as a signal pressure for the line pressure "PL" produced by a pressure regulator valve (not shown).

In accordance with a solenoid pressure "PSOLB" produced by a 2–4/B duty solenoid 24, the second accumulator control valve 4 reduces the line pressure "PL" thereby to regulate an accumulator control pressure "PACCMB".

The low clutch timing valve 5 is a switching valve which connects a signal pressure passage with a drain side when a low clutch timing solenoid 25 is OFF, and connects the signal pressure passage with a communication side with an aid of hydraulic power when the solenoid 25 is ON.

The low clutch sequence valve 6 controls a back pressure of the low clutch accumulator 9 upon shifting up to or shifting down from the 4th speed.

The 2–4 brake timing valve 7 is a switching valve which connects a signal pressure passage with a drain passage when a 2–4 brake timing solenoid 26 is OFF, and connects the signal pressure passage with a communication side with an aid of hydraulic pressure when the solenoid 26 is ON.

The 2–4 brake sequence valve 8 controls a back pressure of the 2–4 brake accumulator 10 upon shifting up to or shifting down from the 3rd speed.

The low clutch accumulator 9 has a back pressure chamber into which the accumulator control pressure "PACCMA" is led through the low clutch sequence valve 6, whereby engagement/releasement action of the low clutch "LOW/C" is smoothly carried out.

The 2–4 brake accumulator 10 has a back pressure chamber into which the accumulator control pressure "PACCMB" is led through the 2–4 brake sequence valve 8, whereby engagement/releasement action of the 2–4 brake "2–4/B" is smoothly carried out.

The high clutch accumulator 11 has a back pressure chamber into which the accumulator control pressure "PACCMA" is directly led, whereby engagement/releasement of the high clutch "HIGH/C" is smoothly carried out.

In FIG. 3A, denoted by numeral 32 is a fluid passage for the low clutch pressure and 33 is a fluid passage for the low clutch accumulator back pressure.

The electric controller includes a control unit 20 which controls the above-mentioned six solenoids 21, 22, 23, 24, 25 and 26.

Information signals from a throttle angle sensor 27, a vehicle speed sensor 28, a turbine speed sensor 29, an oil temperature sensor 30 and other sensors and switches 31 are fed to the control unit 20.

As is seen from FIG. 3B, the control unit 20 is a computer which comprises a central processing unit (CPU), a random access memory (RAM), a read only memory (ROM), an input interface "I-PORT" and an output interface "O-PORT". Instruction signals from the control unit 20 are led to the six solenoids 21, 22, 23, 24, 25 and 26 and an engine controller.

Referring back to FIG. 3A, the control of the back pressure of the low clutch accumulator 9 upon N→D shifting is carried out as follows. That is, upon sensing a switch signal from an inhibitor switch, the control unit 20 judges that the shift lever has been shifted to the drive (D) range from the neutral (N) range. Upon this, the control unit 20 issues a duty command signal "PLDuty" to the line pressure duty solenoid 23 to control the accumulator control pressure "PACCMA" led to the back pressure chamber of the low clutch accumulator 9.

Figures 4, 5:
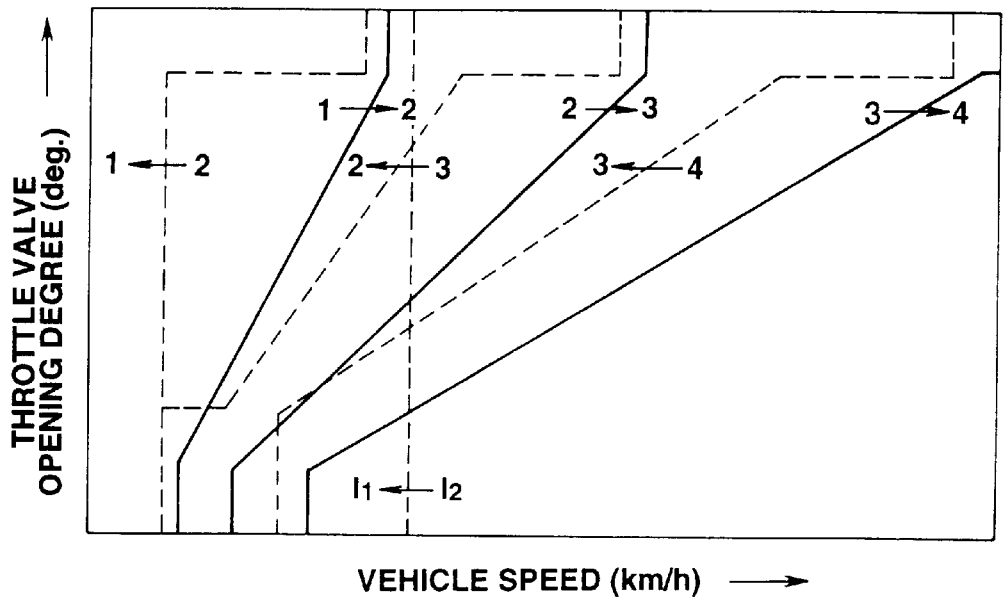
FIG. 4 is a table showing ON/OFF condition of shift solenoids employed in the select-shock control system of the invention.
FIG. 5 is a shift map showing a shift point control executed by the automatic transmission to which the invention is applied.

The automatic shift change executed in the transmission between the 1st speed and the 4th speed is carried out following the shift map of FIG. 5. That is, the automatic shifting in the transmission is carried out with respect to a vehicle speed, a throttle valve position and a predetermined upshift/downshift characteristic of the transmission. When one of the shift characteristic lines is crossed, upshift or downshift command signal is issued from the control unit 20 to make the first and second shift solenoids 21 and 22 ON or OFF in such a manner as is shown in the table of FIG. 5. That is, for example, for achieving a shifting to the 1st speed, both the first and second shift valves 21 and 22 are made ON, that is, energized.

In the following, operation of the select-shock control system of the present invention will be described with reference to the flowchart of FIG. 6 which shows operation steps carried out by the control unit 20 upon the N→D shifting.

At step 70, upon receiving a switch signal from an inhibitor switch, a determination is so made that a shift lever of the transmission has been shifted to D-position from N-position. From this step 70, the select-shock control starts.

At step 71, a duty command signal "PLDuty" for a normal select control (viz., idle select control) is issued to the line pressure duty solenoid 23. That is, upon determination of the N→D shifting, a normal select control signal is outputted for a first predetermined time "t1", which, as is shown, consists of a first higher duty ratio flat part and a second lower duty ratio flat part. This normal select control is executed when the engine speed "Ne" is equal to or smaller than 1600 RPM, the throttle opening degree "TH" is equal to or smaller than $\frac{1}{16}$ of full opening and the vehicle speed "VSP" is equal to or smaller than 7 KM/h.

At step 72, judgment is carried out as to whether the existing throttle opening degree "TH" is greater than a predetermined degree "THa" or not. The predetermined degree "THa" is set for example at $\frac{1}{16}$ of full opening. If NO, that is, when the existing throttle opening degree "TH" is smaller than $\frac{1}{16}$ of full opening, the operation flow goes to step 73. At this step, judgment is carried out as to whether a real time "T" from the time on which the N→D shifting was determined is greater than the first predetermined time "t1" or not. If YES, the operation flow goes to step 74 and the normal select control is ended. If desired, ending of this normal select control may be made when a gear ratio becomes to a predetermined degree.

If YES at step 72, the operation flow goes to step 75. At this step, judgment is carried out as to whether the existing throttle opening degree "TH" is smaller than an arbitrary degree "TH0" or not. For example, the arbitrary degree is $\frac{7}{8}$ of full throttle opening. If NO, that is, when the existing throttle opening degree "TH" is greater than the arbitrary degree, the operation flow goes to step 76. At this step, a so-called "immediate depression responsive control" which will be described in detail at step 82 is inhibited. Then, the operation flow goes to step 77. At this step, a duty command signal "PLDuty" is issued to the line pressure duty solenoid 23, which increases with increase of the throttle opening degree "TH" under a normal line pressure control.

If YES at step 75, that is, when the existing throttle opening degree "TH" is smaller than the arbitrary degree "TH0", that is, when the inequality "THa<TH<TH0" is satisfied, the operation flow goes to step 78. At this step, the immediate depression responsive control starts. Then, the operation flow goes to step 79. At this step, judgment is carried out as to whether the real time "T" from the determination of the N→D shifting is greater than a second predetermined time "t2" (viz., dish plate stroke time) or not. Thus, the normal select control is kept until this time "t2".

If YES, that is, when the real time "T" is greater than the second predetermined time "t2", the operation flow goes to step 80. At this step, judgment is carried out as to whether the real time "T" is smaller than a third predetermined time "t3" (viz., clutch engagement completion time) or not. If desired, in place of this judgment, the clutch engagement completion may be judged from the gear ratio between input and output shafts.

If NO at step 80, the operation flow goes to step 81. At this step, the after-mentioned immediate depression responsive control is ended.

Figure 7:
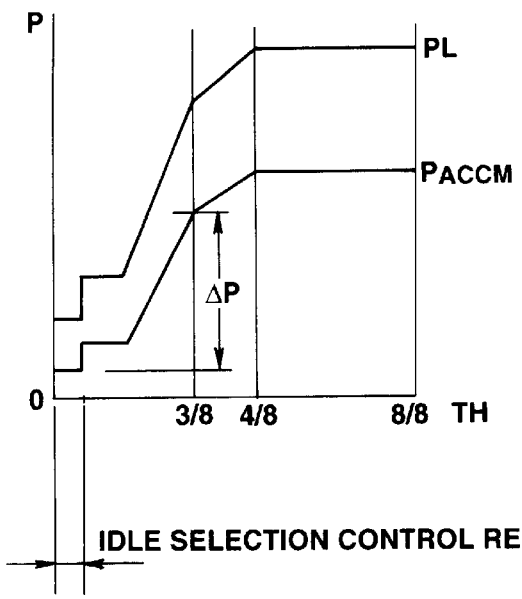
FIG. 7 is a graph showing a line pressure characteristic and a back pressure characteristic of a low-clutch accumulator, with respect to the throttle opening degree.

If YES at step 80, that is, when the inequality "t2<T≦t3" is satisfied, the operation flow goes to step 82. At this step, the immediate depression responsive control is substantially executed. That is, upon satisfaction of the inequality, a duty oblique raising control is executed. That is, upon the satisfaction, a gradually raising duty ratio part "DOR" appears in the duty command signal "PLDuty". Due to appearance of this part "DOR", the back pressure of the low-clutch accumulator 9 (see FIG. 3A) is increased by "ΔP" (see FIG. 7) from a level kept prior to the depression of the accelerator pedal to a level corresponding to the depression degree of the accelerator pedal.

The gradually raising duty ratio part "DOR" has a gradient of "θ".

Figure 8:
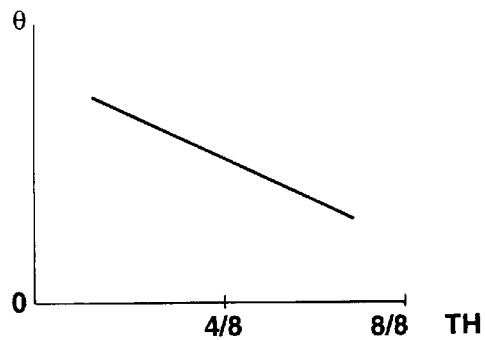
FIG. 8 is a graph showing an obliquely changing characteristic of a duty command signal used in the invention with respect to the throttle opening degree.
Figure 9:
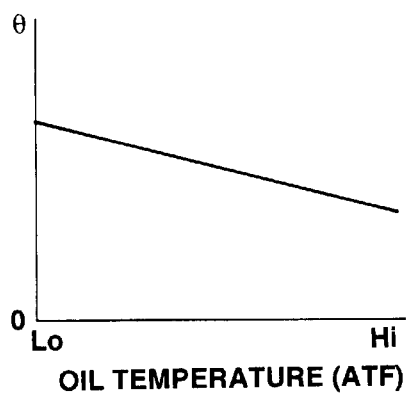
FIG. 9 is a graph showing an obliquely changing characteristic of the duty command signal with respect to the temperature of a hydraulic fluid.
Figure 12B:
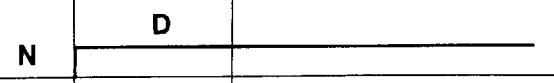

The gradient "θ" may be a fixed value, or gradually decreased with increase of the throttle opening degree as is seen from FIG. 8, or gradually decreased with increase of the temperature of an operating fluid as is seen from FIG. 9. Furthermore, if desired, the gradient "θ" may be changed in accordance with a change of an operating factor or factors, such as a torque capacity "Qa" and/or a torque converter slip degree "(Ne—Nt)", which have an influence on a raising responsibility of the engaging torque for the low clutch "LOW/C".

After step 82, the operation flow goes to step 83 and step 84. At step 83, expiration of the first predetermined time "t1" is detected and at step 84, the immediate depression responsive control is ended.

NORMAL SELECT CONTROL

FIGS. 10A to 10G are graphs showing time charts of various characteristics of the normal select control, which are exhibited when, under idling of an associated engine, no depression of the acceleration pedal is made just after movement of the shift lever from the neutral (N) position to the drive (D) position.

Figure 6:
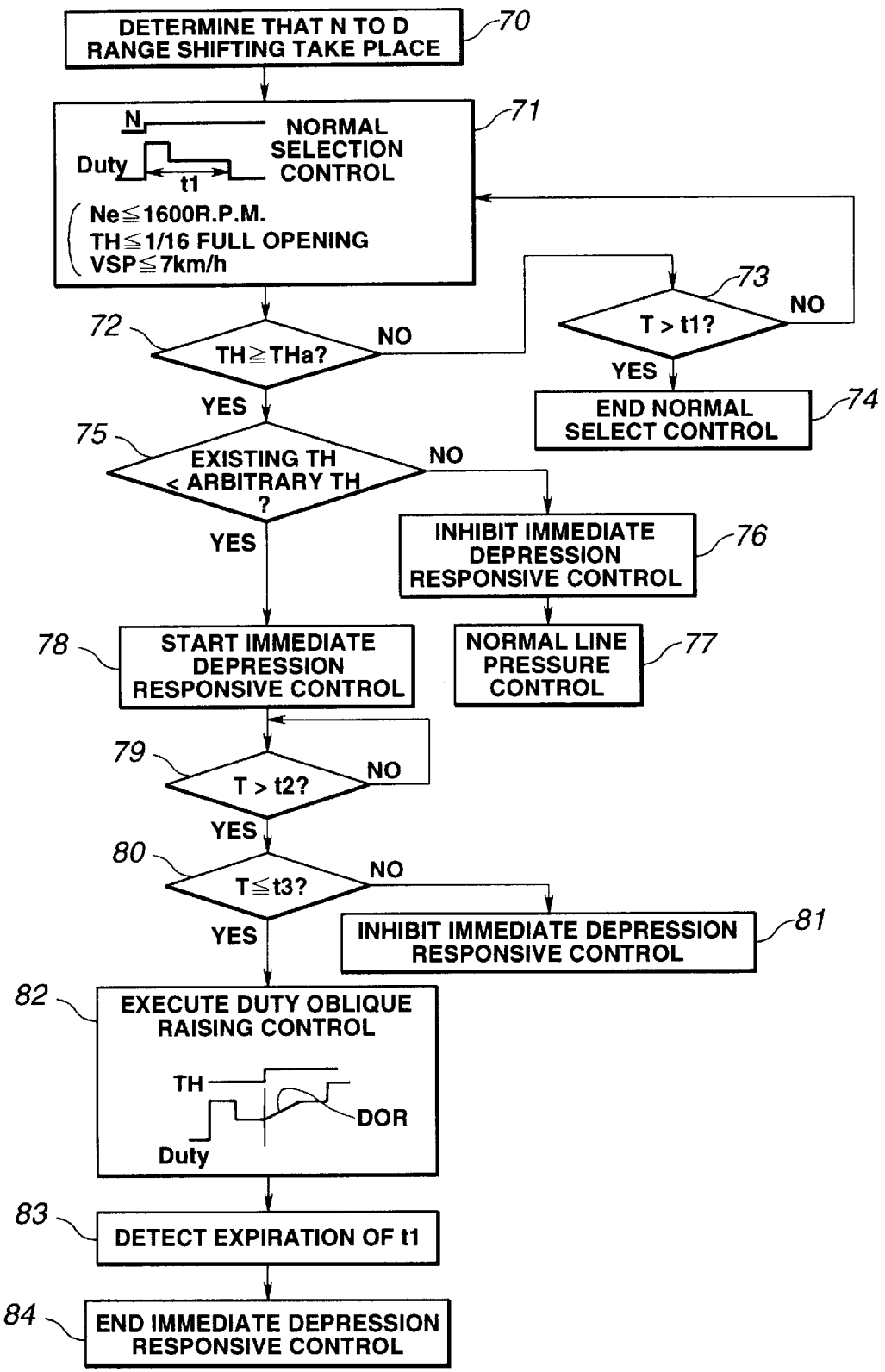
FIG. 6 is a flowchart showing operation steps carried out upon N→D shifting by a control unit employed in the select-shock control system of the invention.

This normal select control is carried out while executing the steps 70, 71, 72, 73 and 74 of the flowchart of FIG. 6.

That is, upon determination of the N→D shifting, the duty command signal "PLDuty" is issued for the first predetermined time "t1", which consists of the first higher duty ratio flat part and the second lower duty ratio flat part. In response to this signal, the accumulator control pressure "PACCMA" is temporarily raised at the time of the N→D determination and thereafter lowered to a constant level, and the low clutch pressure "PL/C" is raised at the time of the N→D determination and thereafter gently raised. Upon raising of the low clutch pressure "PL/C", the engagement movement of the low clutch "LOW/C" starts.

Accordingly, in the transitional stage for the low clutch engagement, the engine torque "TQ" shows a gentle rising and upon completion of the engagement, shows a slight drop. In the transition stage for the low clutch engagement, the engine speed "Ne" shows a very small reduction, and the turbine speed "NT" is gradually lowered to zero.

As is understood from the above description, when the accelerator pedal is not depressed just after the N→D shifting, increase of the engine speed "Ne" and marked increase of the engine torque "TQ" do not occur in the transitional stage for the low clutch engagement. Thus, by only controlling the initial increase of the low clutch pressure "PL/C", the engagement of the low clutch "LOW/C" is smoothly achieved without select-shock.

IMMEDIATE DEPRESSION RESPONSIVE CONTROL

FIGS. 11A to 11H are graphs showing time charts of various characteristics of the immediate depression responsive control, which are exhibited when, under idling of the engine, the accelerator pedal is depressed just after movement of the shift lever to the drive (D) position from the neutral (N) position.

This immediate depression responsive control is carried out while executing the steps 70, 71, 72, 75, 78, 79, 80, 82, 83 and 84 of the flowchart of FIG. 6.

That is, upon determination of the N→D shifting, the duty command signal "PLDuty" for the normal select control is issued for a time longer than the second predetermined time "t2" which corresponds to the disc plate stroke time. Upon sensing the depression of the accelerator pedal, the duty command signal "PLDuty" shows the gradually raising duty ratio part "DOR" which has a duty height "ΔP" corresponding to a duty ratio "P1" corresponding to the depression degree of the accelerator pedal, and upon sensing expiration of the first predetermined time "t1", the duty height of the duty command signal "PLDuty" is increased to a duty ratio "P2" for the normal line pressure control. In response to this signal, the accumulator control pressure "PACCMA" is temporarily raised at the time of the N→D determination and thereafter lowered, and after depression of the accelerator pedal, the accumulator control pressure "PACCMA" is gradually raised. In response to the signal, the low clutch pressure "PL/C" is raised at the time of the N→D determination and thereafter gently raised.

Accordingly, in the transitional stage for the low clutch engagement, the engine torque "TQ" shows a gentle rising and upon completion of the engagement, shows a drop. However, as compared with the torque drop "P3" appearing in the conventional shock control system (see FIG. 15F), the drop in the invention is quite small. Furthermore, as is seen from FIGS. 11G and 11H, the drop "DNe" of the engine speed "Ne" and that "DNT" of the turbine speed "NT" are quite small as compared with those of the conventional system (see FIGS. 15G and 15H).

As is understood from the above description, when, under idling of the engine, the acceleration pedal is depressed just after N→D movement of the shift lever, the engine torque "TQ" and is engine speed "Ne" which have a high responsibility to the pedal depression are gradually lowered by the gradual or slipping engagement of the low clutch "LOW/C". Thus, undesired select-shock can be minimized.

If the gradient "θ" of the gradually raising duty ratio part "DOR" (see FIG. 11C) is varied in accordance with the throttle opening degree and the temperature of the hydraulic fluid as is seen from the graphs of FIGS. 8 and 9, the select-shock minimization is stably carried out irrespective of depression degree of the accelerator pedal and of the operating condition of the transmission.

IMMEDIATE & DEEP DEPRESSION RESPONSIVE CONTROL

FIGS. 12A to 12H are graphs showing time charts of various characteristics of an immediate and deep depression responsive control, which are exhibited when, under idling of the engine, the accelerator pedal is deeply depressed just after movement of the shift lever to the drive (D) position from the neutral (N) position.

This immediate and deep depression responsive control is carried out while executing the steps 70, 71, 72, 75, 76 and 77.

That is, upon sensing the deep depression of the accelerator pedal just after the N→D shifting, the operation flow (see FIG. 6) goes to step 76 to inhibit the above-mentioned immediate depression responsive control and goes to step 77. That is, in this case, normal line pressure control is carried out to effect a rapid rising of the low clutch pressure "PL/C" after the deep pedal depression. With this control, engaging speed of the low clutch "LOW/C" is increased.

DEPRESSION RESPONSIVE CONTROL UNDER DISH PLATE STROKE

FIGS. 13A to 13H are graphs showing time charts of various characteristics of a depression responsive control under dish plate stroke, which are exhibited when, under idling or the engine, the accelerator pedal is depressed during stroke of dish plates of the low clutch "LOW/C" after movement of the shift lever to the drive (D) position from the neutral (N) position.

The "depression responsive control under dish plate stroke" is carried out while executing the steps 70, 71, 72, 75, 78 and 79 of the flowchart of FIG. 6.

That is, upon sensing depression of the accelerator pedal during the stroke of the dish plates just after the N→D shifting, the immediate depression responsive control is postponed until expiration of the second predetermined time "t2", that is, until termination of the dish plate stroke. In other words, once the dish plate stroke terminates, the immediate depression responsive control starts. As will be seen from the partial curves shown by dotted lines, if the immediate depression responsive control is carried out just after depression of the accelerator pedal, the low clutch pressure "PL/C" would show a rapid rising just after termination of the dish plate stroke, which tends to produce a select-shock.

SLOW DEPRESSION RESPONSIVE CONTROL

FIGS. 14A to 14G are graphs showing time charts of various characteristics of a slow depression responsive control, which are exhibited when, under idling of the engine, the accelerator pedal is depressed after engagement of the low clutch "LOW/C" due to the N→shifting.

This slow depression responsive control is carried out while executing the steps 70, 71, 72, 75, 78, 79, 80 and 81 of the flowchart of FIG. 6.

That is, upon sensing such depression of the accelerator pedal, the immediate depression responsive control is not carried out even after engagement of the low clutch "LOW/C". In other words, when the depression of the accelerator pedal is slowly made, the immediate depression responsive control does not occur. As will be seen the partial curves shown by dotted lines, if the immediate depression responsive control is carried out just after engagement of the low clutch "LOW/C", undesired slipping of the low clutch "LOW/C" tends to occur.

It is to be understood that, although the invention has been described with specific reference to a particular embodiment thereof, it is not to be so limited since changes and alternations therein may be made within the full intended scope of this invention as defined by the appended claims. That is, the concept of the invention can be used in case wherein the shift lever is moved from N-position to R(reverse)-position or from N-position to 1 or 2 fixed position.

What is claimed is:

1. A select-shock control system of an automotive automatic transmission in which an engaging element becomes engaged due to application of hydraulic pressure thereto when it is needed to shift the transmission from a neutral condition to a drive condition, said control system comprising:

a select determination section which determines whether or not the transmission has just been shifted from the neutral condition to the drive condition;

an accelerator pedal depression sensing section which senses depression of an accelerator pedal; and a control section which, when said accelerator pedal depression sensing section senses the depression of the accelerator pedal just after determination of the drive condition from the neutral condition by said select determination section, positively induces an oblique rise of said hydraulic pressure from a first lower level which has been kept before depression of the accelerator pedal to a second higher level corresponding to tie degree by which said accelerator pedal is depressed.

2. A select-shock control system as claimed in claim 1, further comprising an accumulator which is installed in a fluid supply line leading to said engaging element, a back pressure of said accumulator being obliquely increased when said accelerator pedal depression sensing section senses the accelerator pedal depression just after determination of the drive condition from the neutral condition to the drive condition by said select determination section.

3. A select-shock control system as claimed in claim 1, in which when the depression degree of said accelerator pedal exceeds a predetermined degree, said control section is suppressed from obliquely raising the hydraulic pressure from said first lower level to said second higher level even when the accelerator pedal depression is carried out just after determination of the drive condition from the neutral condition by said select determination section.

4. A select-shock control system as claimed in claim 1, in which when the depression of said accelerator pedal is commenced within a dish plate stroking period of said engaging element just after determination of the drive condition from the neutral condition by said select determination section, said control section starts the oblique rising of said hydraulic pressure upon expiration of said dish plate stroking period.

5. A select-shock control system as claimed in claim 1, in which when the depression of said acceleration pedal is commenced after complete engagement of said engaging element after determination of the drive condition from the neutral condition by said select determination section, said control section is prevented from carrying out the oblique rising of said hydraulic pressure.

6. A select-shock control system as claimed in claim 1, in which a rate of the oblique rising of said hydraulic pressure by said control section is varied in accordance with an engine torque inputted to the transmission and a temperature of an operating fluid of the engagement element.

* * * * *